April 16, 1963
C. G. KAEHMS
3,086,109
TRAIN WHEEL PROXIMITY DETECTOR
Filed Jan. 18, 1960
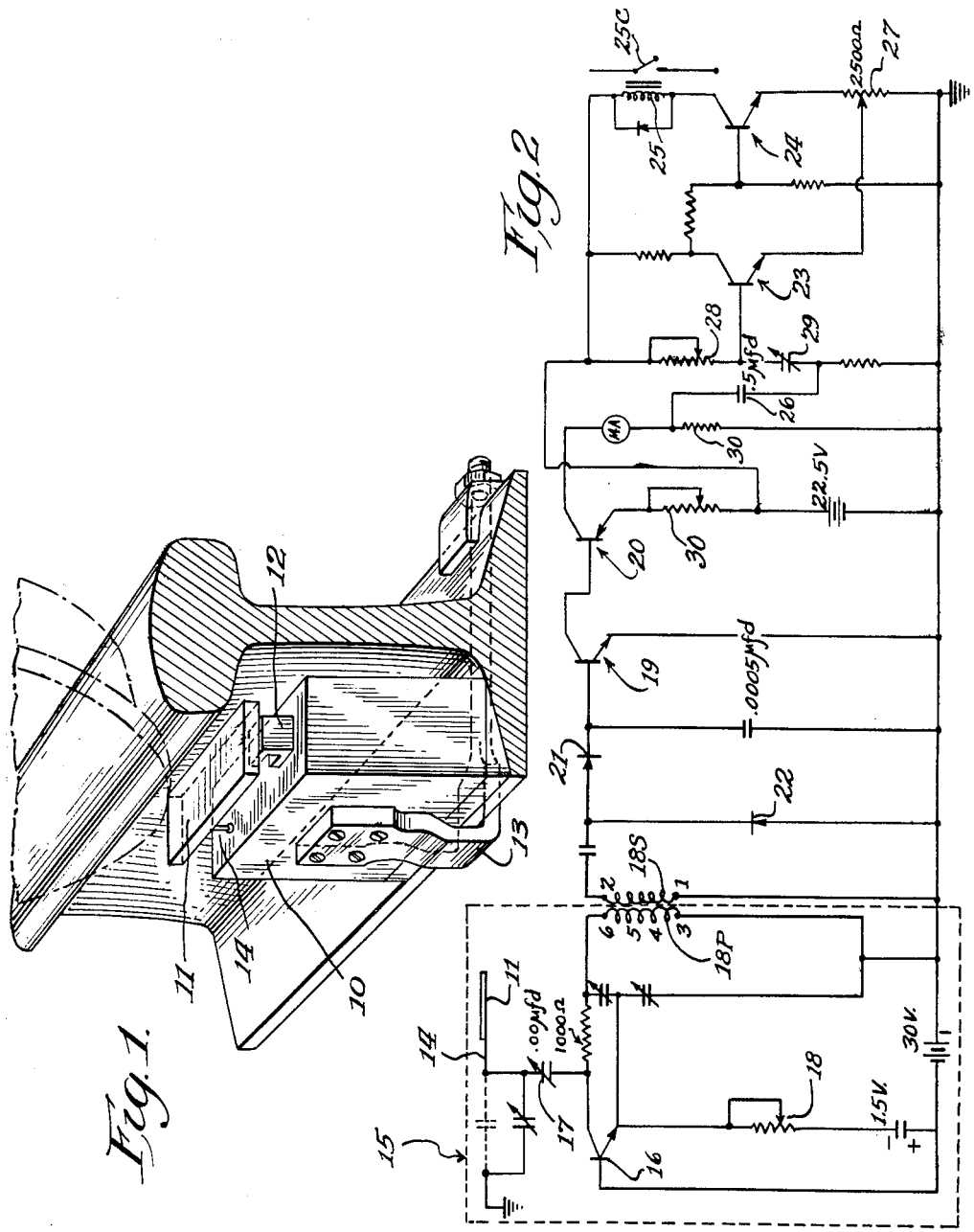
Inventor
Charles G. Kaehms.
By
Mann, Brown and McWilliams,
Attys.

United States Patent Office 3,086,109
Patented Apr. 16, 1963

3,086,109
TRAIN WHEEL PROXIMITY DETECTOR
Charles G. Kaehms, 65 Market St., San Francisco 5, Calif.
Filed Jan 18, 1960, Ser. No. 3,177
5 Claims. (Cl. 246—249)

This invention relates to a train wheel detector for direct mounting to a track rail on the gauge side thereof to individually sense the approach and passage of each train wheel traversing the rail.

Train wheel detectors of this type find application in wheel-counting operations and in equipment such as is employed in infrared hotbox detection systems for correlating the time of operation of the infrared detector with the time of arrival of each train wheel at a location in which the detector is imaged on the journal box or a selected portion thereof.

Many types of rail-mounted switches for direct actuation by wheel contact are known, but such devices are subjected to severe mechanical abuse from normal train operations and suffer weathering and deterioration from extended exposure, with the result that their reliability is impaired. Wheel detectors utilizing magnetic circuit arrangements are also known and used, but some of these depend upon the establishment and maintenance of critically close clearance relationships with respect to the train wheels, while others have sluggish operation and increased power requirements.

The present invention has for its principal object the provision of a proximity type train wheel detector that is fast and reliable in operation, that can restore substantially instantaneously, that is compatible with safe clearances between the detector element and the train wheel, that can tolerate some variation in clearance, and that is substantially maintenance-free.

Other objects and advantages will become apparent during the course of the following description.

In the accompanying drawings forming a part of this specification and in which like numerals are employed to designate like parts throughout the same:

FIG. 1 is a fragmentary perspective view of a section of a track rail illustrating the proximity type train wheel detector of this invention fixed in position on the gauge side of the rail; and FIG. 2 is a wiring diagram of the control circuit for the proximity type detector.

Referring now to the drawings, the proximity detector comprises a metal housing 10 for the circuit components which are shown in FIG. 2 and a metal detector plate 11 supported to extend above the housing by an insulated bracket 12 of Bakelite or similar insulating material. The housing is fixed to the rail R on its gauge side by a clamp 13 which is securely anchored to the housing and which underlies and grips the base of the rail. In one constructional embodiment, the housing is two inches wide, three inches high, and five inches long and the detector element 11 is an aluminum plate 1½" wide, ⅛" thick and 5" long. The detector plate extends in a plane parallel to the plane of the running surface of the rail and is disposed between the head and base of the rail to underlie the path of the flange of a train wheel with approximately ½" clearance existing between the wheel flange and the plate.

In accordance with this invention the detector plate element 11 is mounted in insulated relation to the rail, is provided with a protective coating of insulating material such as epoxy resin, and is connected to the circuit in the housing by a coaxial cable 14 to momentarily develop an increased capacitance effect that triggers the circuit of FIG. 2 upon sensing each approach and passage of a train wheel. With this arrangement, the approach of each wheel to the detector plate element adds to its capacitance effect to produce a change in the associated circuit for actuating an indicator or other corresponding control.

In the preferred circuit arrangement, the detector plate is connected as a frequency-determining element of a continuously running high-frequency transistor oscillator 15 that generates a stable frequency on the order of one or two megacycles and that has a low current consumption on the order of 0.5 milliampere to make a continuous operation feasible. The specific frequency, however, is not important.

The oscillator circuit 15 is shown with a transistor 16 of the NPN type; however, it could as well employ a PNP type transistor. The collector of transistor 16 is connected to a detector plate element through a .001 microfarad capacitor 17 such that the frequency value of the circuit oscillations is dependent upon the capacitance effect of the detector plate in the oscillator circuit. The amplitude of the oscillations is controlled by adjustment of resistor 18.

In the initial installation, coarse adjustments of the frequency of oscillation are made by changing the location of the detector plate with respect to the rail until a position giving stable oscillator performance and rapid cutoff upon approach of a wheel is finally selected. The oscillator circuit 15 is coupled through transformer coils 18P and 18S to control transistor stages 19 and 20. The radio frequency voltage induced in the secondary coil 18S by oscillations in the oscillator circuit 15 is rectified by the diodes 21 and 22 to normally apply a D.C. bias voltage that cuts off transistor 19. With this condition, conduction in the collector circuit of transistor 20 is also cut off.

Transistors 23 and 24 are connected as a univibrator, with transistor 23 normally conducting and transistor 24 normally non-conducting. A control relay 25 in the collector circuit of transistor 24 is thus normally held deenergized. The univibrator is coupled to the collector of transistor 20 through capacitor 26 for actuation when transistor 20 becomes conducting and applies a trigger pulse to the base of transistor 23. Resistor 27 is adjustable to select the response threshold of the univibrator, while resistor 28 and capacitor 29 determine the switching time of the univibrator.

Assuming that there is no train wheel in the vicinity of the detector plate 11, the normal circuit condition of FIG. 2 is as follows: oscillator 15 is running continuously to induce a voltage in the secondary coil 18S which is rectified in the diode circuitry to apply a cutoff bias to the base of transistor 19 and hold transistor 20 cut off. Thus with no current through the resistor 30 in the collector circuit of transistor 20, the univibrator is maintained in its stable state, with transistor 23 conducting and transistor 24 non-conducting and relay 25 deenergized. Relay 25 controls a contact 25C connected in a utilization circuit, which in some instances may operate a wheel-counting machine and which in other instances may operate a control circuit for synchronizing the operation of an infrared detector element with the arrival of each journal box of a train in the field of view of the infrared element.

Upon the arrival of a train, each wheel that traverses the track rail that is provided with the detector plate element momentarily causes the capacitance effect of this element in the oscillator circuit to increase sufficiently to cause an abrupt termination of oscillations. The bias voltage previously applied through the transformer coils and the diodes for holding transistors 19 and 20 non-conducting is immediately removed and a sudden increase of current in the collector of transistor 20 applies a trigger pulse through capacitor 26 for actuating the univibrator through its cycle of operation. This trigger pulse initiates the transition of the univibrator from the stable condition to the unstable condition in which transistor 23 is non-conducting and transistor 24 is conducting. The time duration of the unstable condition is determined by the adjustment of resistor 28 and capacitor 29. During the time that transistor 24 conducts, the relay 25 is energized and, through its contact 25C, energizes the utilization circuit.

As each wheel moves clear of the detector plate 11, the oscillator circuit 15 immediately returns to its normal operating frequency and restores the transistors 19 and 20 to non-conducting condition.

Assuming the wheel proximity indicator of this invention is utilized in an infrared hot journal box detection system that is adjusted for a maximum train speed of 60 m.p.h., it is preferred to adjust the univibrator circuit elements to provide a switching time on the order of 11 to 12 milliseconds.

From an operating standpoint, the proximity detector has the important advantage of eliminating physical contact with the car wheels, and the low-power consumption of the transistorized circuits involves a minimum of maintenance attention. The mounting position of the detector plate is not critical, and initial installation is simple and operational reliability is good.

Another advantage of the proximity detector resides in the fact that its speed of response increases for the faster train speeds. A train wheel passing over the detector element at high speed acts to produce a steep-sided wave form which passes through the control circuits more quickly to produce a proportionally fast response of the control relay. This relationship is advantageous where it is desired to trigger an infrared detector element at the instant that each journal box is in its field of view.

The foregoing description and the drawings are given merely to explain and illustrate the invention and the manner in which it may be performed, and the invention is not to be limited thereto except insofar as the appended claims are so limited since those skilled in the art who have this disclosure before them will be able to make modifications and variations therein without departing from the scope and spirit of the invention.

I claim:

1. A train wheel proximity detector for rigid mounting to a track rail to individually detect each successive train wheel transversing such rail and comprising an oscillator circuit that includes a detector plate having a capacitance effect in said circuit determining a stable frequency of oscillation thereof, means mounting said detector plate in insulated spaced relation along the gauge side of the rail, with said plate being disposed to extend in a predominantly horizontal plane located in vertically spaced relation beneath the flange path of each train wheel traversing the rail such that upon the approach and movement of a train wheel thereover, the capacitance effect of said detector plate in said oscillator circuit momentarily increases to momentarily terminate oscillation of said circuit at said stable frequency, control means responsive each time said oscillator circuit terminates its oscillation at said stable frequency, and utilization means connected for actuation by each such response of said control means.

2. A train wheel proximity detector for rigid mounting to a track rail to individually detect each successive train wheel traversing such rail and comprising an oscillator circuit that includes a detector plate having a capacitance effect in said circuit determining a stable frequency of oscillation thereof, means mounting said detector plate in insulated spaced relation along the gauge side of the rail and in rigidly mounted relation to the rail to undergo movement only jointly therewith, with said plate being disposed to extend in a predominantly horizontal plane located in vertically spaced relation beneath and parallel with the flange path of each train wheel traversing the rail such that upon the approach and movement of a train wheel thereover, the capacitance effect of said detector plate in said oscillator circuit momentarily increases to momentarily terminate oscillation of said circuit at said stable frequency, control circuit means responsive each time said oscillator circuit terminates its oscillation at said stable frequency, and utilization means connected for actuation by each such response of said control circuit means.

3. In a train wheel proximity detector for rigid mounting to a track rail to individually detect each successive train wheel traversing such rail, a first group of electric circuit elements connected to constitute an output control circuit and a second group of electric circuit elements connected with a detector plate to constitute a continuously running oscillator circuit in which said detector plate has a capacitance effect determining a stable frequency of oscillation thereof, a housing fixed to said rail on the gauge side thereof for joint movement therewith and mounting said first and second groups of electric circuit elements in protected relation therein, a bracket of insulating material fixed to said housing and mounting said detector plate in insulated, spaced relation above said housing with said plate being located in a predominantly horizontal plane located in vertically spaced parallel relation beneath the flange path of each train wheel traversing the rail such that upon approach and movement of a train wheel thereover, the capacitance effect of said detector plate in said oscillator circuit momentarily increases to momentarily terminate oscillation of said circuit at said stable frequency, said output circuit being responsive each time said oscillator terminates its oscillation at said stable frequency to sense each wheel.

4. A train wheel proximity detector for rigid mounting to a track rail to individually detect each successive train wheel traversing such rail and comprising a detector plate, a housing fixed to said rail on its gauge side for joint movement therewith and containing an oscillator circuit that includes a connection to the detector plate to cause the plate to provide a capacitance effect in said circuit determining a stable frequency of oscillation thereof, a transistor having a normally non-conducting collector circuit, a univibrator coupled to said collector circuit and responsive to initiation of conduction therein to undergo a timed cycle of operation, a control relay connected for operation substantially throughout the timed cycle of operation of said univibrator, and rectifier means coupled to said oscillator circuit and responsive to the presence of oscillations therein at said stable frequency for applying a bias voltage to maintain said collector circuit non-conducting, and means mounting said detector plate in insulated, spaced relation above said housing, with said plate being disposed to extend in a predominantly horizontal plane located in vertically spaced relation beneath and parallel with the flange path of each train wheel traversing the rail such that upon the approach and movement of a train wheel thereover, the capacitance effect of said detector plate in said oscillator circuit momentarily increases to momentarily block oscillation of said circuit, thereby removing said bias voltage and initiating conduction through said collector circuit to trigger said univibrator through its timed cycle of operation.

5. A train wheel proximity detector for rigid mounting to a track rail to individually detect each successive train wheel traversing such rail and comprising an oscillator circuit that includes a detector plate having a capacitance effect in said circuit determining a stable frequency of oscillation thereof, means stationarily secured directly to said rail and disposed on the gauge side thereof to support said detector plate in insulated spaced relation along said gauge side with said plate being disposed to extend substantially in a plane located in vertically spaced parallel relation beneath the flange path of each train wheel traversing the rail such that upon the approach and movement of a train wheel thereover, the capacitance effect of said detector plate in said oscillator circuit momentarily increases to momentarily terminate oscillation of said circuit at said stable frequency, control means responsive each time said oscillator circuit terminates its oscillation at said stable frequency, and utilization means connected for actuation by each such response of said control means.

References Cited in the file of this patent

UNITED STATES PATENTS

| | | |
|---|---|---|
| 1,702,997 | Ewing et al. | Feb. 19, 1929 |
| 1,806,093 | Sorensen | May 19, 1931 |
| 1,905,332 | Barbulsco | Apr. 25, 1933 |
| 2,100,756 | Shepard | Nov. 30, 1937 |
| 2,231,105 | Block et al. | Feb. 11, 1941 |
| 2,343,987 | Lindsay et al. | Mar. 14, 1944 |
| 2,442,491 | Gieskieng et al. | June 1, 1948 |
| 2,691,104 | Corbitt | Oct. 5, 1954 |
| 2,892,078 | Orthuber | June 23, 1959 |
| 2,966,582 | Wachtel | Dec. 27, 1960 |
| 2,973,430 | Pelino | Feb. 28, 1961 |

FOREIGN PATENTS

| | | |
|---|---|---|
| 507,096 | France | June 14, 1920 |
| 1,203,211 | France | July 27, 1959 |
| 1,212,232 | France | Oct. 19, 1959 |